(12) United States Patent
Nanri

(10) Patent No.: US 6,456,918 B2
(45) Date of Patent: Sep. 24, 2002

(54) METHOD FOR CONTROLLING A CONTINUOUSLY VARIABLE TRANSMISSION

(75) Inventor: Takehiko Nanri, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,945

(22) Filed: Mar. 30, 2001

(30) Foreign Application Priority Data

Mar. 31, 2000 (JP) ........................................ 2000-099456

(51) Int. Cl.⁷ .............................. G06F 7/00; G06F 19/00
(52) U.S. Cl. ........................ 701/51; 701/55; 180/65.7; 477/46
(58) Field of Search ............................ 701/51, 55, 56; 180/65.6, 65.7; 477/15, 20, 46

(56) References Cited

U.S. PATENT DOCUMENTS

| | | | | |
|---|---|---|---|---|
| 5,157,608 A | * | 10/1992 | Sankpal et al. ............... | 701/51 |
| 5,772,554 A | * | 6/1998 | Tabata ......................... | 477/109 |
| 5,884,201 A | * | 3/1999 | Kawai ......................... | 701/22 |
| 5,982,045 A | * | 11/1999 | Tabata et al. ................. | 290/17 |
| 6,035,735 A | * | 3/2000 | Graf et al. ..................... | 74/335 |
| 6,052,639 A | * | 4/2000 | Ashizawa et al. ............. | 701/55 |
| 6,070,118 A | * | 5/2000 | Ohta et al. .................... | 701/65 |

FOREIGN PATENT DOCUMENTS

JP                09203460         5/1997

* cited by examiner

Primary Examiner—Gertrude Arthur
(74) Attorney, Agent, or Firm—Birch, Stewart, Kolasch & Birch, LLP

(57) ABSTRACT

A method of diminishing shift shock in a stepped shift mode in a continuously variable transmission. A continuously variable transmission having an automatic shift mode and a stepped shift mode possesses a shift shock diminishing control function. In this control, when shift-down is made in the stepped shift mode (S.1), a timer is allowed to start counting (S.2) and the magnitude of deceleration G during change of the change gear ratio by a control motor is compared with a threshold value (S.4), and if the deceleration magnitude is larger than the threshold value, the supply of electric power to the control motor is stopped for only a very short time to decrease the deceleration G thereby diminishing the shift shock (S.5).

12 Claims, 7 Drawing Sheets

METHOD FOR CONTROLLING A CONTINUOUSLY VARIABLE TRANSMISSION

BACKGROUND OF THE INVENTION

1. Field of the Invention

The present invention relates to a method for controlling a continuously variable transmission having an automatic shift mode for changing the change gear ratio in a stepless manner and a stepped shift mode for changing the change gear ratio manually to a predetermined stepped change gear ratio. Particularly, the invention is concerned with a method which permits a smooth stepped speed change.

2. Description of Background Art

In Japanese Unexamined Patent Publication No. H9-203460 there is disclosed a method for controlling a continuously variable transmission capable of making a shift control with use of a stepped shift mode. According to the method disclosed therein, switching to a stepped shift mode is made by means of a mode change-over switch, and a shift-up or shift-down signal is outputted from a shift switch by operating a shift lever, with the result that a target change gear ratio is selected from among those preset in multi-stages and shift-up or shift-down is performed. Thus, a stepped shift control is made as if it were made by a manual type stepped transmission.

In FIG. 3, the reference mark TH denotes a throttle opening (%), and throttle opening (%) and RC (%) are plotted along the ordinate axis, while time is plotted along the abscissa axis. Separately, vehicle speed is calculated on the basis of a change ratio in the number of pulses per unit time which are fed from the speed sensor 25 constituted by a pulsar.

SUMMARY AND OBJECTS OF THE INVENTION

According to the present invention, for solving the above-mentioned problem, there is provided a method for controlling a continuously variable transmission having an automatic shift mode for changing the change gear ratio in a stepless manner and a stepped shift mode for changing the change gear ratio manually to a predetermined stepped change gear ratio, wherein when it is detected that the deceleration has exceeded a predetermined value while the change gear ratio is changed by a shift-down operation in the stepped shift mode, the change gear ratio changing operation is stopped, and when it is thereafter detected that the deceleration has decreased to a level below the predetermined value, the change gear ratio changing operation which has been stopped is resumed.

Upon shift-down in the stepped shift mode, if the deceleration exceeds a predetermined value during changing of the change gear ratio, a control unit detects this state and stops the change gear ratio changing operation temporarily. By so doing, it is possible to decrease the shift speed and thereby decrease the deceleration to a value smaller than the predetermined value, thus permitting a smooth shift without feeling any shift shock. Thereafter, when it is detected that the deceleration has decreased to a level below the predetermined value, the change gear ratio changing operation which has been stopped is resumed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
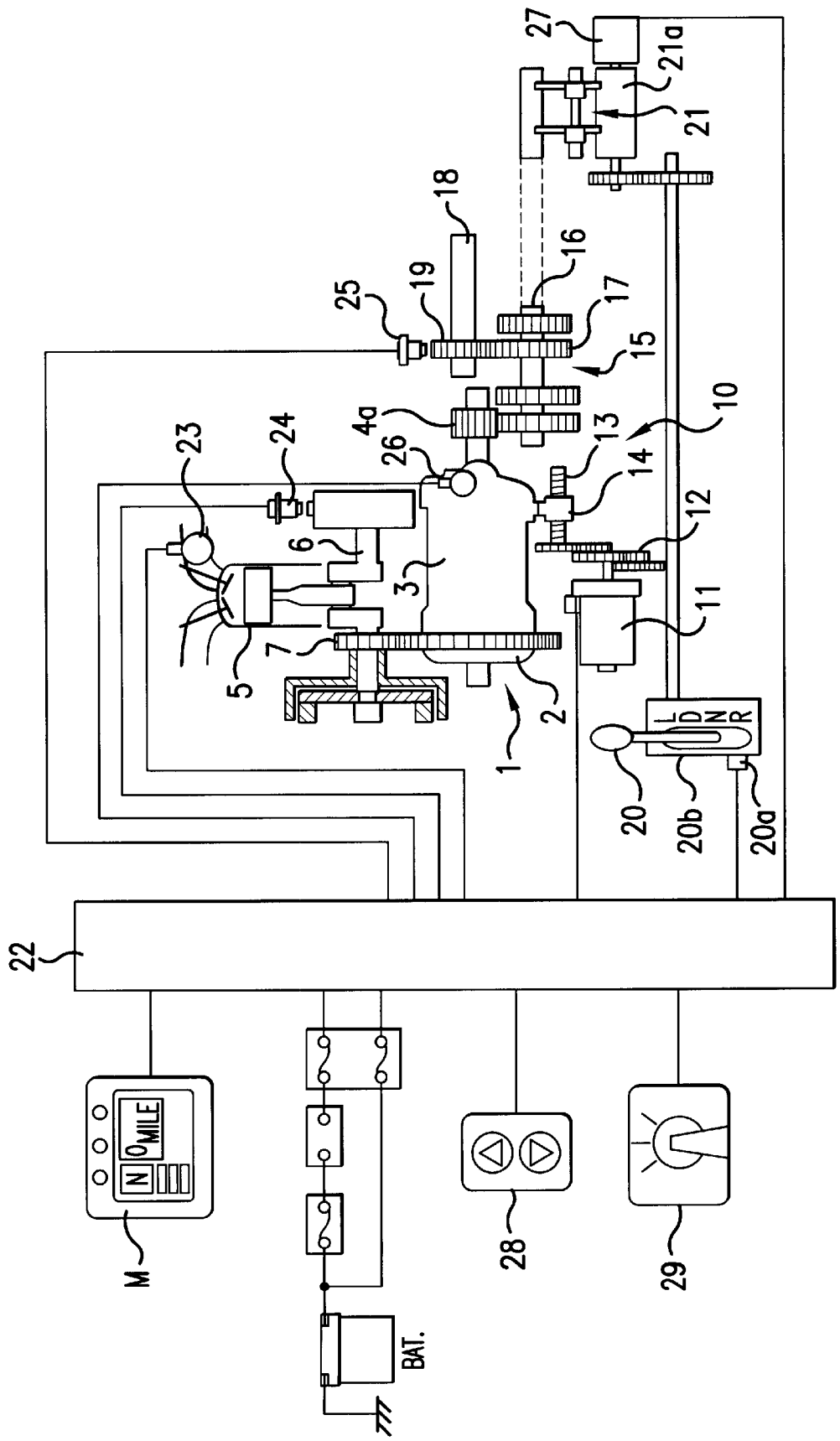
FIG. 1 illustrates a control system in the whole of a hydrostatic continuously variable transmission.

An embodiment of the present invention will be described hereinunder with reference to the drawings. Referring first to FIG. 1, a background will now be given about controlling a hydrostatic type continuously variable transmission. The hydrostatic type continuously variable transmission, indicated by 1, comprises a fixed displacement hydraulic pump 2 and a variable displacement hydraulic motor 3 both integral with each other on a drive shaft 4. The fixed displacement hydraulic pump 2 and the variable displacement hydraulic motor 3 are connected together through a hydraulic closed circuit. A driven gear 8 of the fixed displacement hydraulic pump 2 is rotated with a driving gear 7 mounted on a crank shaft 6 of an engine 5 to generate oil pressure. With the oil pressure, the rotational speed of the variable displacement hydraulic motor is changed and a shift output is provided to the drive shaft 4. At this time, the change gear ratio can be changed as desired by changing the tilt angle of a movable swash plate (to be described later) with the use of a tilt angle control mechanism 10, the movable swash plate is incorporated in the variable displacement hydraulic motor 3.

In the tilt angle control mechanism 10, the output of a control motor 11 is transmitted to a reduction gear 12 to change, through a ball screw 13 and a slider 14, the tilt angle of the movable swash plate incorporated in the variable displacement hydraulic motor 3. A shift output of the hydrostatic continuously variable transmission 1 is transmitted from an output gear 4a of the drive shaft 4 to a secondary reduction mechanism 15, and a shift output of the secondary reduction mechanism 15 is transmitted from an output gear 17 mounted on a shift output shaft 16 to a final output gear 19 mounted on a final output shaft 18.

In the secondary reduction mechanism 15, shift positions, which are Forward L or D, Reverse R and Neutral N, are switched from one to another by manually operating a submission lever 20 to actuate a shifter 21, the submission lever 20 being provided in a traveling range change-over switch 20b. L range is for low-speed traveling, D range is for normal traveling, N is neutral, and R is reverse. Upon shifting to R, the change gear ratio is fixed to LOW ratio. In connection with the shift positions L and D in the forward range, various traveling modes which will be described later can be switched from one to another by operating a mode map switch 29 mounted on a steering wheel. The traveling modes are broadly classified into an automatic shift mode and a stepped shift mode. If the stepped shift mode is selected, both shift-up and shift-down can be effected by manually operating a shift switch 28 mounted on the steering wheel.

Figure 7:
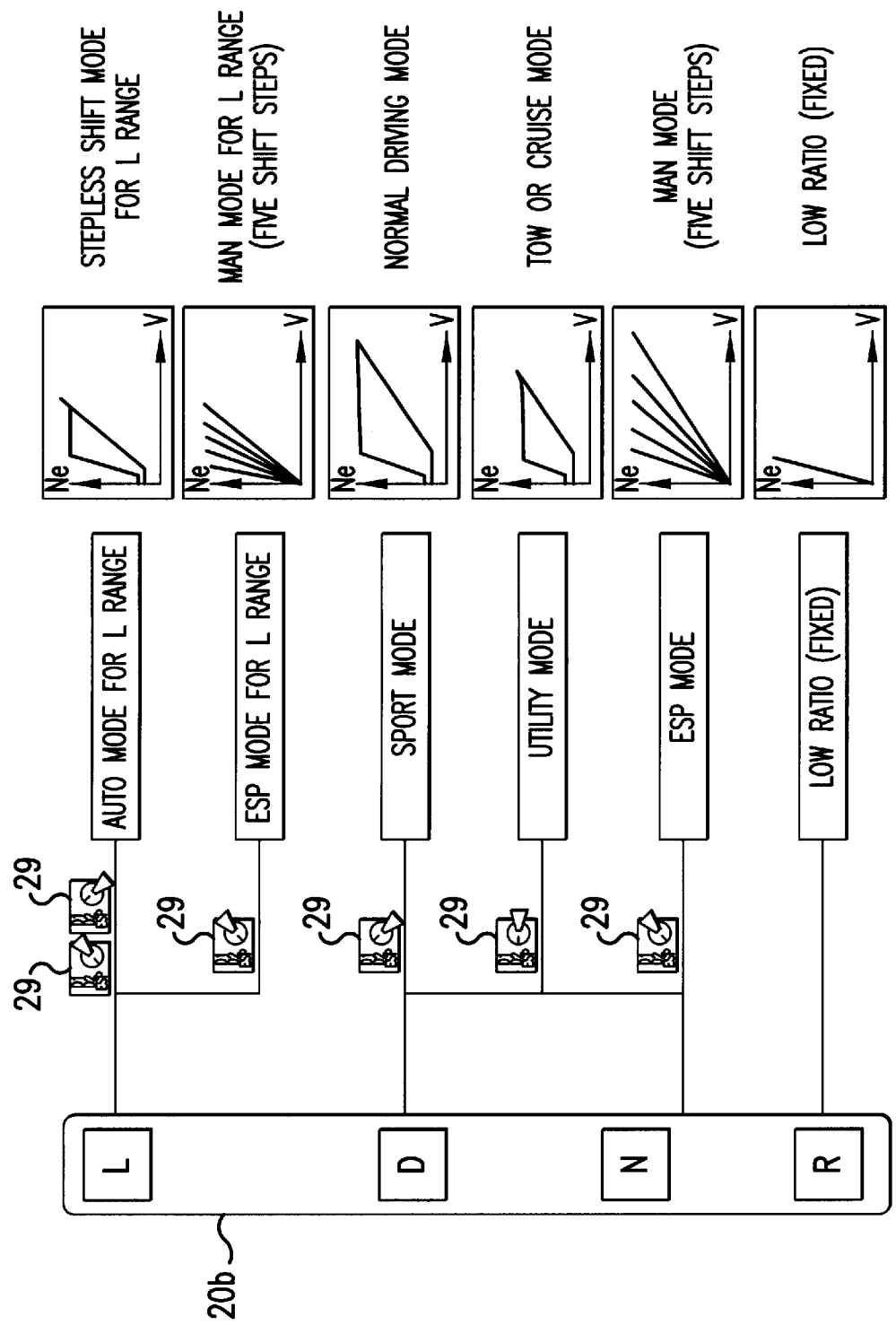
FIG. 7 illustrates traveling modes.

FIG. 7 illustrates traveling modes which are provided in advance. If L range is selected by the submission lever 20, switching of the mode map switch 29 to D1 or D2 results in AUTO mode for L range which is a stepless shift mode for L range only. Switching to ESP results in ESP mode for L range which is a manual mode for L range only, in which it is possible to perform a manual shift in five forward shift steps.

In the case of D range, if the mode map switch 29 is switched to D1, a SPORT mode results, which is suitable for normal traveling. Switching the mode map switch 29 to D2 results in UTILITY mode, in which is suitable for traction or cruising, in which it is possible to perform a manual shift in five forward shift steps.

Actual shift in these stepless and stepped shift ranges is conducted by the foregoing tilt angle control. The tilt angle control is effected by a control unit 22 which controls the operation of the control motor 11 in the tilt angle control mechanism 10 in accordance with signals provided from various sensors. The control unit 22 outputs a display signal to an indicator of an instrument panel M and is supplied with electric power from a vehicular battery.

As signals for the tilt angle control mechanism 10, which signals are inputted to the control unit 22, there are, as shown in FIG. 1, a throttle opening signal provided from a throttle sensor 23 which is disposed on an intake side of the engine 5, an Ne signal provided from a revolution sensor 24 which is disposed in proximity to the crank shaft 6, a vehicle speed signal provided from a speed sensor 25 which is disposed in proximity to the final output gear 19, a swash plate angle signal provided from an angle sensor 26 which is disposed in the variable displacement hydraulic motor 3, a shift position signal provided from a shift sensor 27 which is integral with a shift drum 21a of the shifter 21, and signals provided from the shift switch 28 and the mode map switch 29 both mounted on the steering wheel. Also inputted is a signal provided from a reverse switch 20a attached to a lower portion of the submission lever 20 in the range change-over switch 20b.

Figure 2:
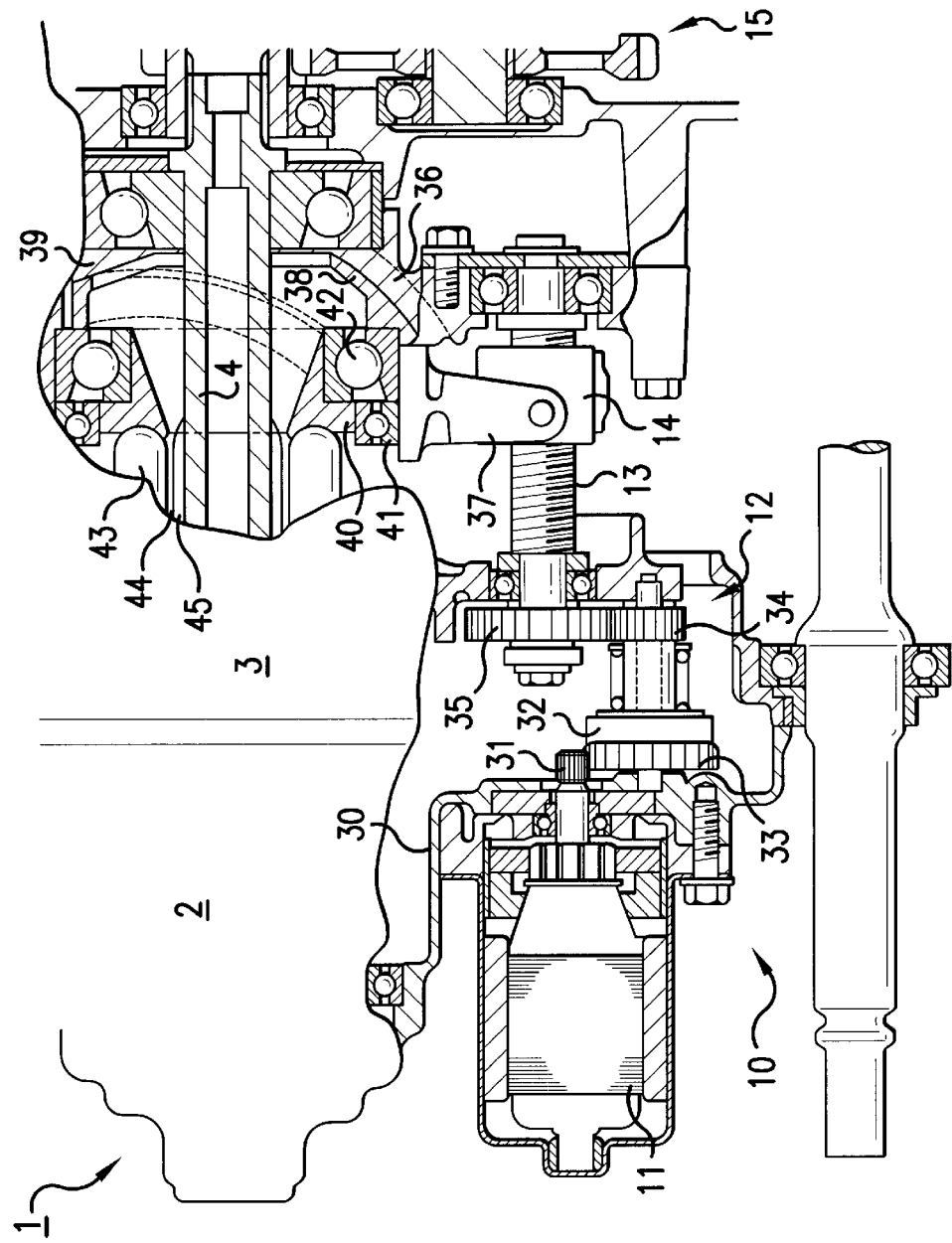
FIG. 2 illustrates a tilt angle control mechanism.

Next, with reference to FIG. 2, the following description is provided about the tilt angle control mechanism 10. The control motor 11 in the tilt angle control mechanism 10 is supported by a housing 30 of the fixed displacement hydraulic pump 2 and an output from an output gear 31 thereof is transmitted to a ball screw driving gear 35 through an input gear 33 of a torque limiter 32 and further through a gear 34. The ball screw driving gear 35 rotates integrally with the ball screw 13.

With forward or reverse rotation of the ball screw 13, the slider 14, which is formed with a nut, moves axially in either the forward or reverse direction on the screw.

The ball screw 13 is supported at both ends thereof by a housing 36 of the hydraulic motor 3.

Projecting outward from the housing 36 of the variable displacement hydraulic motor 3 is an arm 37, one end of which is pivotably secured to the slider 14. The opposite end of the arm 37 is integral with a swash plate holder 38 which is supported within the housing 36. The swash plate holder 38 is supported to be capable of rolling onto a concavely curved surface 39 formed in the housing 36, so that as the arm 37 turns, the swash plate holder 38 also turns together with the arm on the concavely curved surface 39 and changes its angle.

A movable swash plate 40 is rotatably held inside the swash plate holder 38 through bearings 41 and 42. As the angle of the swash plate holder 38 changes, the tilt angle of the movable swash plate 40, which tilt angle is an angle of a rotational surface of the movable swash plate 40 relative to the axis of the drive shaft 4, is changed. In the illustrated state, the tilt angle is 90°, indicating a TOP state corresponding to a change gear ratio of 1.0.

A hydraulic plunger 43 of the variable displacement hydraulic motor 3 is pushed against the movable swash plate 40. A plurality of hydraulic plunger 43 are disposed in the circumferential direction of a drum-like rotary member 44. With the hydraulic pressure on the fixed displacement hydraulic pump 2 side, the plural hydraulic plungers 43 project and are pushed against the movable swash plate 40 and impart a rotational force to the rotary member 44 in accordance with the tilt angle of the movable swash plate 40. The rotary member 44 is circumferentially splined at 45 to the drive shaft 4 so that the drive shaft 4 is rotationally driven with rotation of the rotary member 44.

Figure 3:
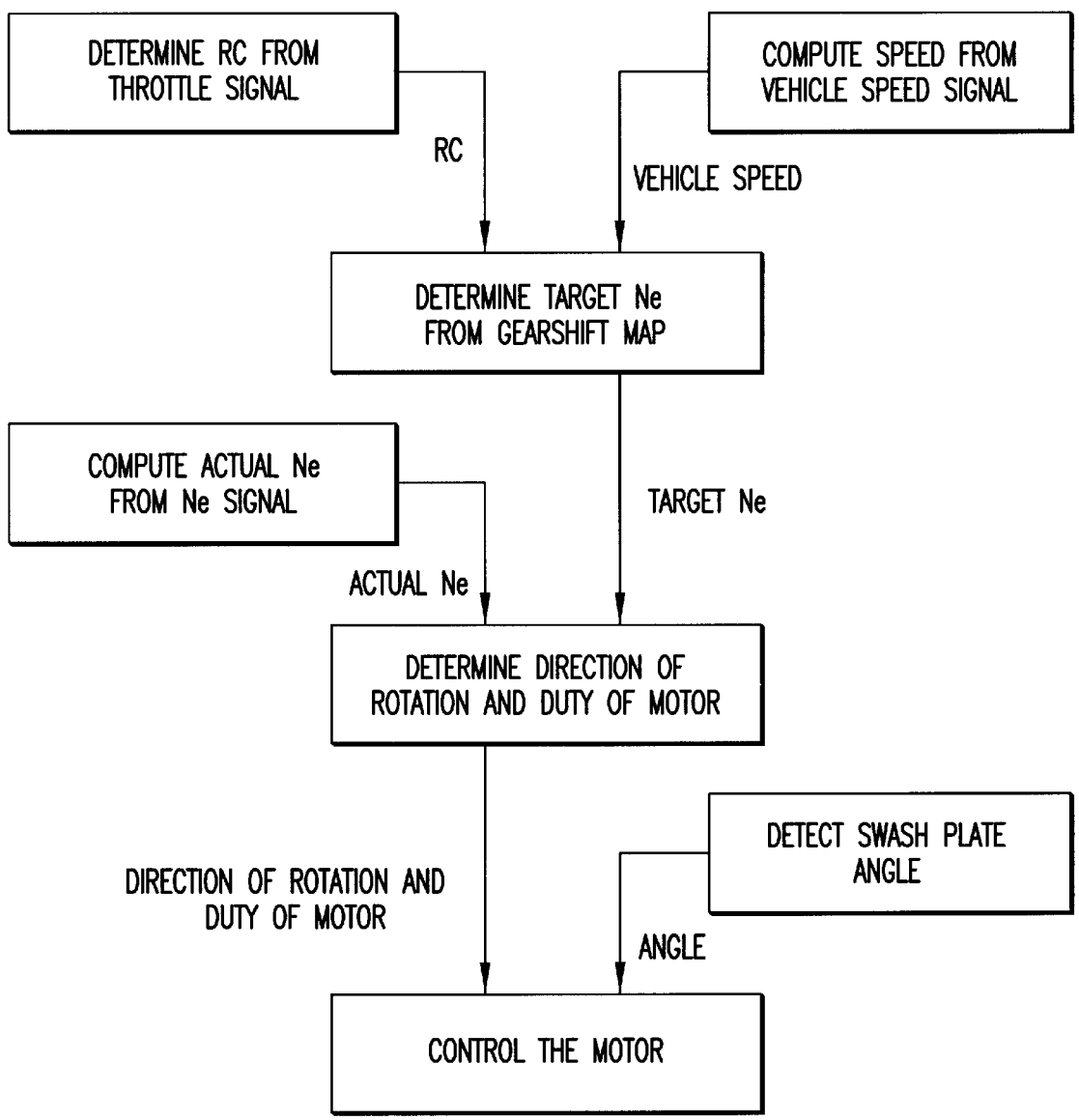
FIG. 3 is flow chart of a shift control in an automatic shift mode.
Figure 4:
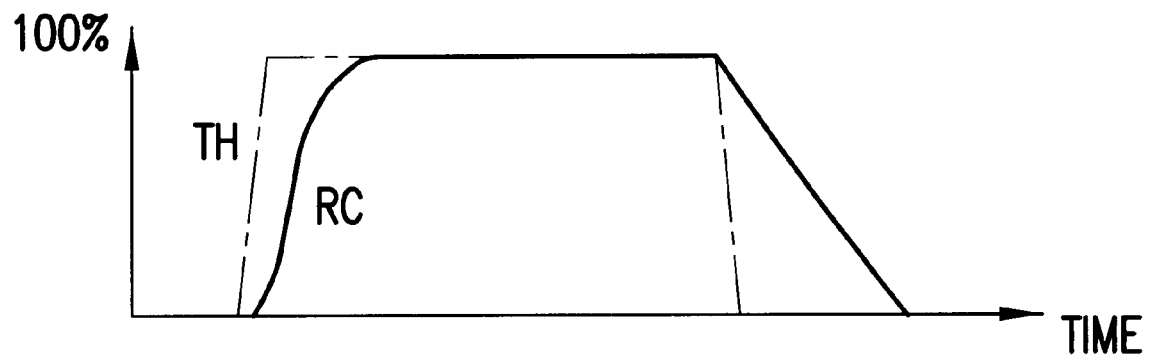
FIG. 4 illustrates how to determine RC.

Next, with reference to FIG. 3, a description of the stepless shift control performed in the control unit 22 is provided. First, an RC (riding condition) is produced in accordance with the throttle signal provided from the throttle sensor 23. The RC takes a value which increases or decreases relative to the value of the throttle signal. Basically the following relation exists, as shown in FIG. 4:

Opening the throttle valve→RC increases.

Closing the throttle valve→RC decreases.

In FIG. 3, the reference mark TH denotes a throttle opening (%), and throttle opening (%) and RC (%) are plotted along the ordinate axis, while time is plotted along the abscissa axis. Separately, vehicle speed is calculated on the basis of a change ratio in the number of pulses per unit time which are fed from the speed sensor 25 constituted by a pulsar.

Figure 5:
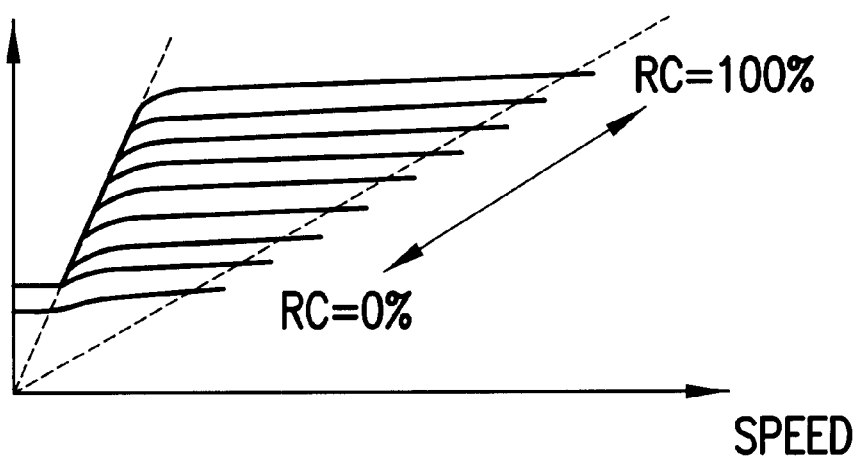
FIG. 5 illustrates a gearshift map.

Subsequently, a target Ne is determined on the basis of the above RC and vehicle speed and with reference to a pre-stored gearshift map. An example of a gearshift map is shown in FIG. 5. For example, various such modes as L range mode only, SPORT mode only, and UTILITY mode only are incorporated. These modes can be selected by the mode map switch 29.

Further, an actual Ne is calculated in accordance with an Ne signal sent from the revolution sensor 24, then the actual Ne thus calculated is compared with the foregoing target Ne to determine either forward or reverse rotational direction and DUTY of the control motor 11. To be more specific, this determination is made as follows in accordance with the direction of the movable swash plate:

Actual Ne >Target Ne→Move the movable swash plate to TOP side.

Actual Ne <Target Ne→Move the movable swash plate to LOW side.

DUTY is determined as follows:

DUTY=K1 |actual Ne-target Ne|

(K1: coefficient)

Where DUTY stands for the proportion of an electric current which is passed through the control motor 11 and is used for controlling the speed of the control motor. At 100% DUTY, the speed of the control motor 11 becomes maximum, and at 0% DUTY, the rotation of the control motor stops.

Thereafter, the control motor 11 is controlled in accordance with the rotational direction and DUTY of the motor and the angle of the movable swash plate calculated on the basis of the angle signal provided from the angle sensor 26. More specifically, the control motor 11 is driven in accordance with the rotational direction and DUTY of the motor and LOW and TOP ratios are measured from the angle of the movable swash plate, then when the shift ratio is deviated from the TOP ratio, the rotation of the control motor 11 is stopped.

In this embodiment it is possible to make a stepped shift control in the stepped shift mode. The stepped shift control means a shift control which permits manual switching from one change gear ratio to another in a continuously variable transmission as if it were in a manual multi-step transmission. In the same way as above the stepped shift control is performed by controlling the tilt angle of the movable swash plate 40 in the control unit 22. It suffices to change the control contents so as to effect the control in steps.

Switching the stepped shift mode and the automatic shift mode from one to the other is performed by the mode map switch 29, and a stepped shifting operation in the stepped shift mode can be done by pushing the shift switch 28. The shift switch 28 is provided with a shift-up button and a shift-down button so that at every depression of either button there is performed shift-up or shift-down step by step.

Figure 6:
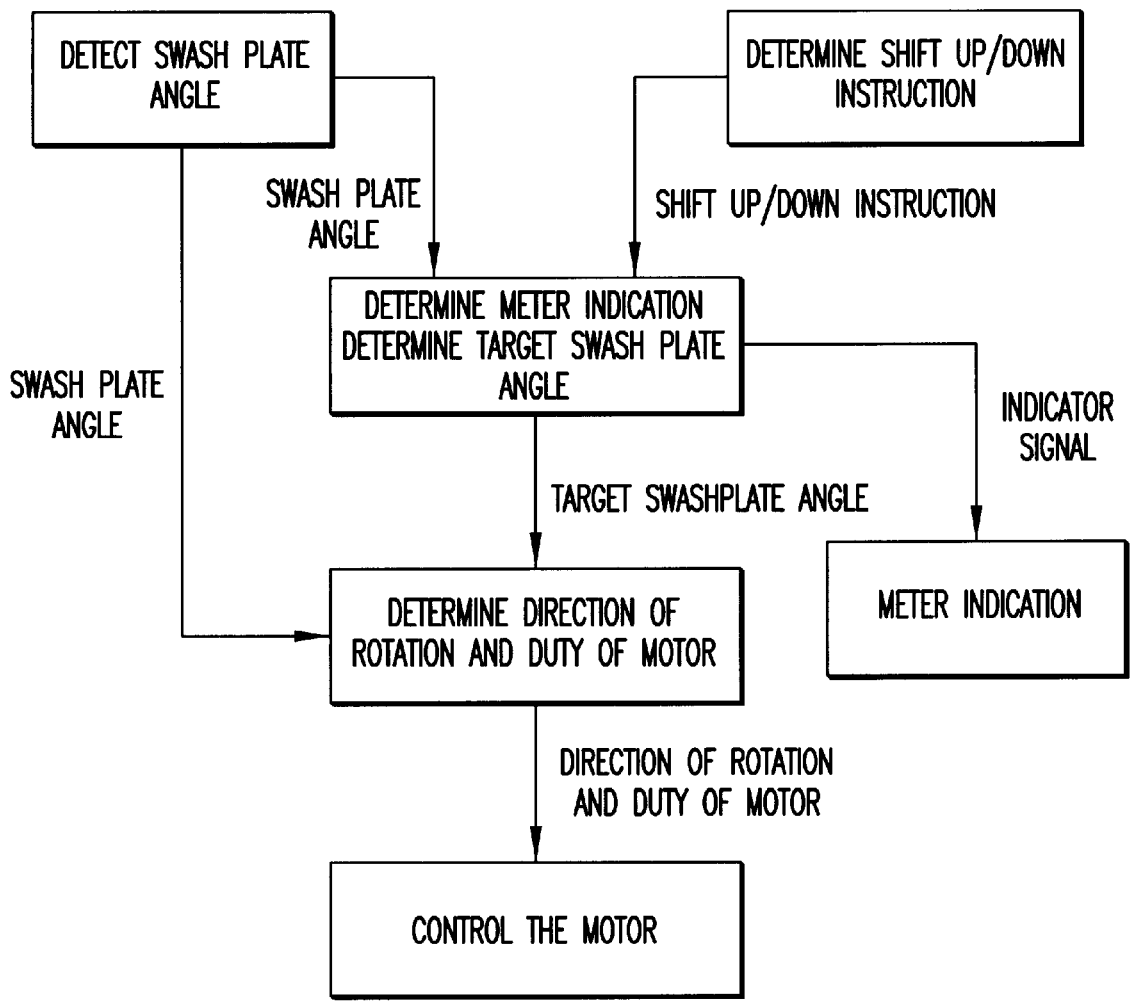
FIG. 6 is a flow chart of a shift control in a stepped shift mode.

FIG. 6 shows a control procedure of the control unit 22 in the stepped shift control. First, a tilt angle is calculated on the basis of a swash plate angle signal provided from the angle sensor 26, and a shift instruction indicating either shift-up or shift-down is determined in accordance with a shift signal provided from the shift switch 28. This is done in the following manner. If the shift-up button in the shift switch 28 is pushed, there is determined a shift-up instruction, while if the shift-down button is pushed, there is determined a shift-down instruction.

Next, a meter indication and a target swash plate angle are determined in accordance with the foregoing tilt angle and shift instruction. The meter indication is determined by determining the number of gear steps proportional to the number of shift steps in a manual transmission, then determining an indication signal for the indicator of the meter M, outputting the indication signal to the meter M, and allowing the determined number of gear steps to be indicated on the meter M.

With a shift instruction inputted, the target swash plate angle is determined in accordance with the following conditions relative to the current gear indication signal:

(1) Shift-up instruction→Shift-up by one step (2) Shift-down instruction→Shift-down by one step Subsequently, the target swash plate angle thus determined and the tilt angle are compared with each other and forward or reverse rotational direction and DUTY of the control motor 11 are determined as follows:

Tilt angle>Target swash plate angle→Move the movable swash plate 40 to LOW side.

(2) Tilt angle<Target swash plate angle→Move the movable swash plate 40 to TOP side.

DUTY is determined by the following equation:

DUTY=K2 |tilt angle-target swash plate angle|

(K2: coefficient)

Thereafter, on the basis of the motor rotational direction and DUTY, the operation of the control motor 11 is controlled to tilt the movable swash plate 40 by a predetermined angle. In this way the hydrostatic continuously variable transmission 1 can perform a stepped shift proportional to the stepped shift in a manual multi-step transmission.

In the stepped shift mode in this embodiment, moreover, it is possible to make a shift shock diminishing control.

In the shift shock diminishing control, the stepped shift mode in L or D range is selected by switching the mode map switch 29 to the foregoing ESP to prevent the feeling of a shift shock when shift-down is made by the shift switch 28.

More specifically, when a shift-down signal is inputted from the shift switch 28 in the stepped shift mode, the control unit 22 causes a timer to start operation, then when the deceleration G which has been calculated on the basis of a change ratio in the number of pulses per unit time fed from the speed sensor 25 during counting by the timer exceeds a predetermined threshold value, the supply of electric power to the control motor 11 which is being shifted toward a target change gear ratio is stopped for only a very short time to diminish the deceleration, thereby decreasing the deceleration G and diminishing the shift shock. The threshold value can be determined in a bodily sensation so as not to give a feeling of a shift shock.

Thereafter, when the deceleration G decreases to a level below the threshold value, the supply of electric power to the control motor 11 is resumed to continue the change gear ratio changing operation which has been stopped. If the deceleration G exceeds the threshold value even once during counting by the timer, the deceleration G is monitored until later issuance of a new shift-down instruction, and when the deceleration G again exceeds the threshold value, the supply of electric power to the control motor is stopped for only a very short time.

Figure 8:
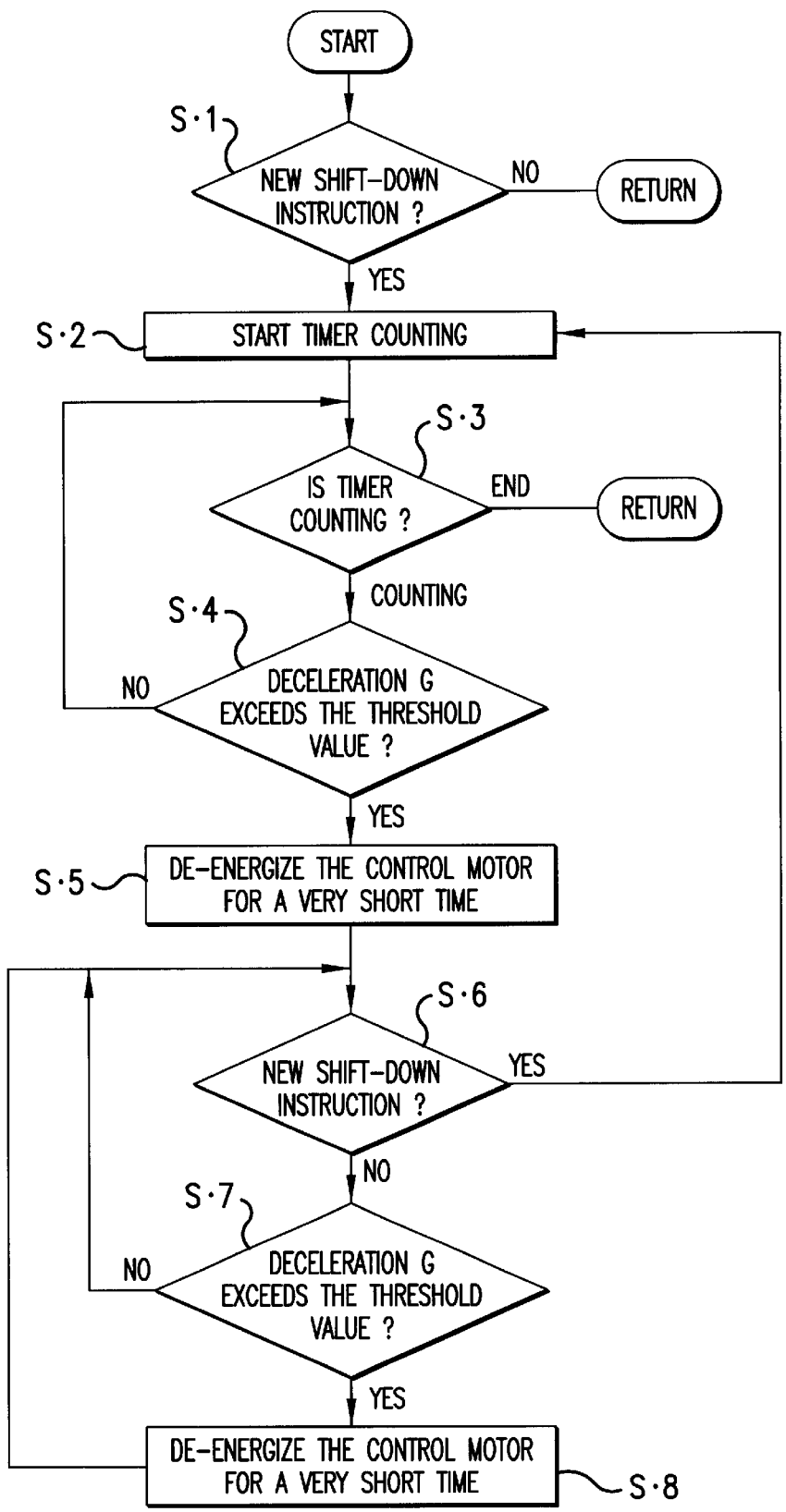
FIG. 8 is a flow chart of a shift shock diminishing control.

FIG. 8 is a flow chart of the shift shock diminishing control performed by the control unit 22. After the start of control, a check is made to see if a new shiftdown instruction has been issued or not (S.1), and if the answer is negative, the processing flow returns to START, while if the answer is affirmative, the timer is allowed to start counting (S.2). Then, it is judged whether the timer is counting or not (S.3), and upon lapse of the set time, the flow returns to START, while if the timer is counting, it is judged whether the deceleration G has exceeded the threshold valve or not (S.4).

If the deceleration G has not exceeded the threshold value, the flow returns to step (S.3), while if it exceeds the threshold value, the supply of electric power to the control motor 11 is stopped for only a very short time (S.5). After this short-time stop, the supply of electric power to the control motor 11 is resumed and a check is made to see if a new shift-down instruction has been issued or not (S.6), and if the answer is affirmative, the flow returns to step (S.2), allowing the timer to start counting again. On the other hand, if there is no new instruction, it is judged whether the deceleration G has exceeded the threshold value or not (S.7), and if the answer is negative, the flow returns to step (S.6) for repetition, while if the answer is affirmative, the control motor 11 is de-energized again for a very short time (S.8), followed by repetition from step (S.6).

In this way the shift speed by the control motor 11 is adjusted by stopping the supply of electric power intermittently according to the magnitude of deceleration G, thus permitting a smooth shift-down operation. Since the deceleration G is calculated on the basis of the vehicle speed provided from the speed sensor 25, the shift speed can be correlated with the vehicle speed.

The present invention is applicable not only to the hydrostatic continuously variable transmission system but also to such continuously variable transmissions as a CTV system and an electronically controlled belt conveyor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling a continuously variable transmission having an automatic shift mode for changing the change gear ratio in a stepless manner and a stepped shift mode for changing the change gear ratio manually to a predetermined stepped change gear ratio comprising:
    stopping the change gear ratio changing operation when it is detected that the deceleration has exceeded a predetermined value while the change gear ratio is changed by a shift-down operation in said stepped shift mode; and
    resuming the change gear ratio changing operation which has been stopped when it is thereafter detected that the deceleration has decreased to a level below the predetermined value.

2. The method for controlling a continuously variable transmission according to claim 1, wherein when the deceleration has exceeded a predetermined value, the change gear ratio changing operation is temporarily stopped.

3. The method for controlling a continuously variable transmission according to claim 2, wherein a smooth shift without a feeling of shift shock occurs by decreasing the shift speed and thereby decreasing the deceleration to a value smaller than the predetermined value.

4. The method for controlling a continuously variable transmission according to claim 1, wherein the manual stepped shift mode includes an actuator for shift-up of the stepped shift mode and for shift-down of the stepped shift mode.

5. The method for controlling a continuously variable transmission according to claim 4, wherein when the shift-down is inputted a timer is actuated and when the deceleration on the basis of a change ratio in the number of pulses per unit time exceeds a predetermined value, a control motor shifted toward a target change gear ratio is stopped for a predetermined period of time to diminish the deceleration and diminishing the shift shock.

6. The method for controlling a continuously variable transmission according to claim 5, wherein when the deceleration decreases to a level below the predetermined value, the control motor is resumed to continue the change gear ratio changing operation.

7. A method for controlling a continuously variable transmission having an automatic shift mode for changing the change gear ratio in a stepless manner and a stepped shift mode for changing the change gear ratio manually to a predetermined stepped change gear ratio comprising:
    changing the change gear ratio in a shift-down operation in said stepped shift mode;
    detecting deceleration has exceeded a predetermined value in the shift-down mode;
    stopping the change gear ratio changing operation when the deceleration has exceeded a predetermined value;
    detecting the deceleration has decreased to a level below the predetermined value; and
    resuming the change gear ratio changing operation which has been stopped when it is thereafter detected that the deceleration has decreased to a level below the predetermined value.

8. The method for controlling a continuously variable transmission according to claim 7, wherein when the deceleration has exceeded a predetermined value, the change gear ratio changing operation is temporarily stopped.

9. The method for controlling a continuously variable transmission according to claim 8, wherein a smooth shift without a feeling of shift shock occurs by decreasing the shift speed and thereby decreasing the deceleration to a value smaller than the predetermined value.

10. The method for controlling a continuously variable transmission according to claim 7, wherein the manual stepped shift mode includes an actuator for shift-up of the stepped shift mode and for shift-down of the stepped shift mode.

11. The method for controlling a continuously variable transmission according to claim 10, wherein when the shift-down is inputted a timer is actuated and when the deceleration on the basis of a change ratio in the number of pulses per unit time exceeds a predetermined value, a control motor shifted toward a target change gear ratio is stopped for a predetermined period of time to diminish the deceleration and diminishing the shift shock.

12. The method for controlling a continuously variable transmission according to claim 11, wherein when the deceleration decreases to a level below the predetermined value, the control motor is resumed to continue the change gear ratio changing operation.

* * * * *